United States Patent
Makino

(10) Patent No.: US 10,610,898 B2
(45) Date of Patent: Apr. 7, 2020

(54) SURFACE PROPERTY AND INSPECTION SORTING APPARATUS, SYSTEM, AND METHOD

(71) Applicant: SINTOKOGIO, LTD., Nagoya-shi, Aichi (JP)

(72) Inventor: Yoshiyasu Makino, Toyokawa (JP)

(73) Assignee: SINTOKOGIO, LTD., Nagoya (JP)

(*) Notice: Subject to any disclaimer, the term of this patent is extended or adjusted under 35 U.S.C. 154(b) by 22 days.

(21) Appl. No.: 15/117,054

(22) PCT Filed: Oct. 8, 2014

(86) PCT No.: PCT/JP2014/076900
§ 371 (c)(1),
(2) Date: Aug. 5, 2016

(87) PCT Pub. No.: WO2015/125340
PCT Pub. Date: Aug. 27, 2015

(65) Prior Publication Data
US 2017/0173637 A1  Jun. 22, 2017

(30) Foreign Application Priority Data
Feb. 21, 2014 (JP) .................. 2014-031354

(51) Int. Cl.
*B07C 5/344* (2006.01)
*G01N 27/90* (2006.01)
(Continued)

(52) U.S. Cl.
CPC ............. *B07C 5/344* (2013.01); *G01N 27/72* (2013.01); *G01N 27/80* (2013.01); *G01N 27/9026* (2013.01); *G01N 33/20* (2013.01)

(58) Field of Classification Search
CPC .................................................. B07C 5/344
(Continued)

(56) References Cited

U.S. PATENT DOCUMENTS 3,235,795 A * 2/1966 Uozumi ............... G01N 27/023
324/234
3,896,646 A * 7/1975 Lange .................... B21C 51/00
324/238
(Continued)

FOREIGN PATENT DOCUMENTS

CN 101122580 A 2/2008
CN 102356296 A 2/2012
(Continued)

OTHER PUBLICATIONS

Machine translation of Shinichi et al. JP2011-122897.*
(Continued)

*Primary Examiner* — Charles A Fox
*Assistant Examiner* — Michael E Butler
(74) *Attorney, Agent, or Firm* — Brinks Gilson & Lione

(57) ABSTRACT

To provide a surface property inspection sorting apparatus, system, and method capable of efficiently performing steps to evaluate the surface properties of spring-shaped members. A surface property inspection and sorting apparatus 1 includes a surface property inspection device, a measuring member for measuring the surface properties of the spring-shaped members M, and a sorting means for sorting the spring-shaped members into good and bad parts. The measuring member is constituted so that spring-shaped members can pass through an inspection detector, and the surface properties of the spring-shaped member can be evaluated and a pass/fail judgment made by a surface property inspection device based on output signals output from an AC bridge circuit while the spring-shaped member passes through the inspection detector.

8 Claims, 8 Drawing Sheets

(51) Int. Cl.
*G01N 27/72* (2006.01)
*G01N 27/80* (2006.01)
*G01N 33/20* (2019.01)

(58) Field of Classification Search
USPC .................................................. 209/567
See application file for complete search history.

(56) References Cited

U.S. PATENT DOCUMENTS

| | | | | |
|---|---|---|---|---|
| 5,414,353 | A * | 5/1995 | Weischedel | G01N 27/82 |
| | | | | 324/232 |
| 5,618,738 | A * | 4/1997 | Ao | B82Y 25/00 |
| | | | | 257/E43.006 |
| 5,898,302 | A | 4/1999 | Soules | |
| 7,491,319 | B1 * | 2/2009 | Yang | B07C 5/344 |
| | | | | 209/57 |
| 2008/0001609 | A1 | 1/2008 | Kojima et al. | |
| 2014/0084910 | A1 | 3/2014 | Makino | |
| 2017/0170041 | A1 * | 6/2017 | Stopper | H01L 21/67271 |

FOREIGN PATENT DOCUMENTS

| | | | |
|---|---|---|---|
| CN | 103033557 A | 4/2013 | |
| EP | 3 098 600 A1 | 11/2016 | |
| JP | 62-24984 U | 2/1987 | |
| JP | 02-168191 A | 6/1990 | |
| JP | 04-296649 A | 10/1992 | |
| JP | 06-331602 A | 12/1994 | |
| JP | 2008-2973 A | 1/2008 | |
| JP | 2011-122897 A | 6/2011 | |
| JP | 2013-529286 A | 7/2013 | |
| JP | 2013-181235 A | 9/2013 | |
| WO | WO2012153862 | * 11/2012 | ............. G01N 27/80 |

OTHER PUBLICATIONS

International Search Report, and English language translation thereof, in corresponding International Application No. PCT/JP2014/076900, dated Dec. 22, 2014, 6 pages.
Extended European Search Report in corresponding European Application No. 14882918.7, dated Oct. 18, 2017.
Office Action in China Application No. 201480076045.5, dated May 23, 2019, 13 pages.

* cited by examiner

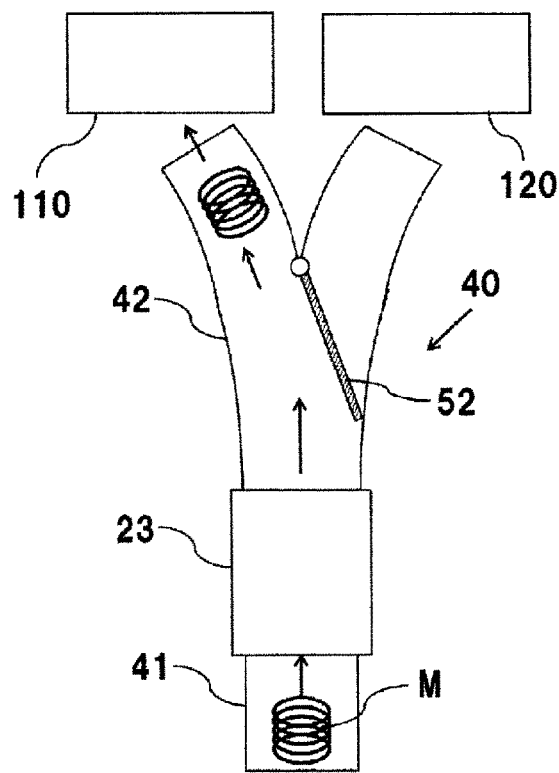
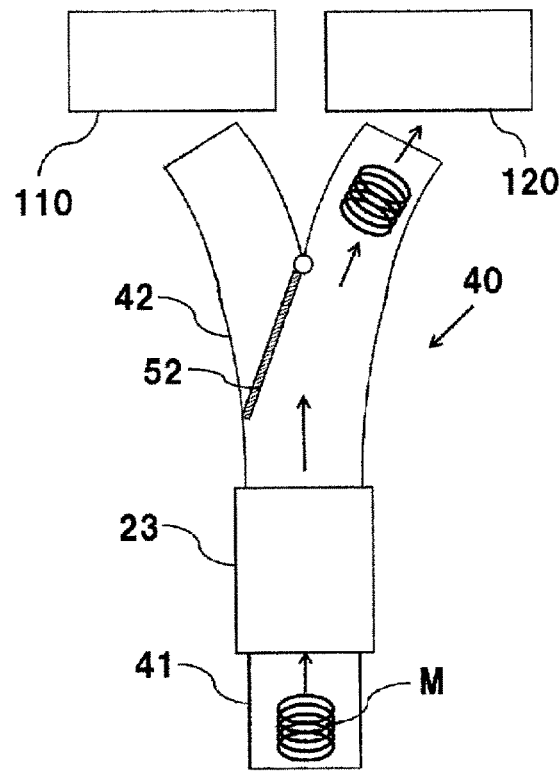

SURFACE PROPERTY AND INSPECTION SORTING APPARATUS, SYSTEM, AND METHOD

This application is a 371 application of PCT/JP2014/076900 having an international filing date of Oct. 8, 2014, which claims priority to JP2014-031354 filed Feb. 21, 2014, the entire contents of which are incorporated herein by reference.

TECHNICAL FIELD

The present invention pertains to a surface property inspection and sorting apparatus, surface property and inspection sorting system, and surface property and inspection sorting method for inspecting the quality of the surface treatment state of spring-shaped members subjected to surface treatments such as shot-peening, heat treatment, or nitriding, and sorting between good and bad parts.

BACKGROUND ART

Surface hardening by heat treatment or nitriding and the like, or surface treatment by shot-peening and the like, are performed to improve the wear-resistance and fatigue strength of steel manufactured products such as gears, shafts, and springs.

Conventionally the evaluation of surface properties such as residual stress and hardness following surface processing of such manufactured products has been performed by sample destructive inspection. This led to problems such as the inability to inspect all manufactured directly, and rendering unusable the inspected, since inspection was destructive.

A strong requirement has therefore emerged to develop a device capable of non-destructively inspecting manufactured product surface properties. As an example of such a device, Patent Document 1 discloses a non-destructive inspection device for a shot-peened surface, wherein an AC (alternating current) signal is input while varying the frequency in an inspection circuit comprising a coil disposed over a shot-peened surface, and the state of residual stress in the inspected object is inspected using impedance frequency response characteristics in the inspection circuit.

PRIOR ART REFERENCES

Patent Documents

Patent Document 1: Japanese Published Unexamined Application 2008-2973

SUMMARY OF THE INVENTION

Problems to be Solved by the Invention

In the technology described above, thermal emission effects caused by the concentration of eddy currents can easily arise, so that large amounts of time are required to inspect the entirety of the surface treated portion. In spring-shaped members such as valve springs, the time required for surface treatment (cycle time) is short compared to the time required for large members such as gears, thus extending the time needed for surface property inspection and for sorting between good and bad properties, so that the inspection and sorting steps control the overall process rate. Also, no specific proposal has been made for a constitution capable of efficiently sorting spring-shaped members after a pass/fail judgment, resulting in the problem that sorting work also took large amounts of time, and inspection and sorting could not be efficiently performed.

The present invention pertains to a surface property inspection and sorting apparatus, surface property and inspection sorting system, and surface property and inspection sorting method for inspecting the quality of the surface treatment state of spring-shaped members subjected to surface treatments such as shot-peening, heat treatment, or nitriding, and for sorting between good and bad parts.

Means for Resolving Problems

In order to achieve the aforementioned object, a first aspect of the present invention is a surface property inspection and sorting apparatus for evaluating a surface property of a spring-shaped member subjected to surface treatment by a surface treatment apparatus and sorting the spring-shaped members between good parts and bad parts, comprising: a surface property inspection device; a guide member; and a sorting device; the surface property inspection device comprising: an AC bridge circuit, an AC power supply for supplying AC power to the AC bridge circuit, and an evaluation apparatus for evaluating surface property of the spring-shaped member based on output signals from the AC bridge circuit; wherein the AC bridge circuit comprises: a variable resistor capable of varying the distribution ratio between a first resistor and a second resistor; an inspection detector comprising a coil capable of exciting an AC magnetic field, formed so that said coil can be disposed to excite an eddy current in the spring-shaped member; and a reference detector for detecting a reference state serving as a reference for comparing outputs from the inspection detector; wherein the first resistor, the second resistor, the reference detector, and the inspection detector constitute the AC bridge circuit; and wherein the evaluation apparatus evaluates the surface property of the spring-shaped member based on output signals from the AC bridge circuit while AC power is supplied to the AC bridge circuit, the inspection detector detects electromagnetic property of the spring-shaped members, and the reference detector detects the reference state; wherein the guide member guides the spring-shaped members so that the spring-shaped members carried from the surface treatment apparatus pass through the inspection detector without stopping; wherein the sorting device sorts the spring-shaped members between good parts and bad parts after surface property has been evaluated by the inspection detector; and wherein the surface property inspection device performs an evaluation and pass/fail judgment of the surface property of the spring-shaped member based on the output signals from the AC bridge circuit during the period when the spring-shaped member is passing through the inspection detector.

The first aspect of the invention enables the excitation of an eddy current in the spring-shaped member by an inspection detector coil, such that the surface property of the spring-shaped member can be evaluated based on output signals output from an AC bridge circuit. This enables high precision inspection of the surface state using a simple circuit configuration.

Also, because the spring-shaped member is passed through the inspection detector without stopping, and spring-shaped member surface property is evaluated and a pass/fail judgment made by a surface property inspection device, the time for evaluating spring-shaped member surface property and making a pass/fail judgment can be shortened. This makes it possible to evaluate spring-shaped member surface property and make pass/fail judgments in a manner suited to short cycle times. It also enables a reliable selection between spring-shaped member good and bad product using a sorting means.

Note that "surface property" refers to the "property from the outermost surface down to the interior affected surface."

A second aspect of the invention uses a technical means that in the surface property inspection and sorting apparatus according to the first aspect of the invention, the apparatus further comprises a sensing device for sensing the fact that the spring-shaped member has been guided to the inspection detector, whereby the surface property inspection device extracts the output signal from the AC bridge circuit based on a sensing signal from the sensing device.

In the second aspect of the invention, the fact that the spring-shaped member has passed through the guide member and been guided into the inspection detector can be reliably sensed by the sensing device and, triggered by this, the surface property of the spring-shaped member can be evaluated and a pass/fail judgment made.

In a third aspect of the invention, a technical means is used whereby the surface property inspection and sorting system comprises the surface property inspection and sorting apparatus according to the first or second aspect of the invention; and a transport device for transporting the spring-shaped member subjected to surface treatment by the surface treatment apparatus to the surface property inspection device.

As in the third aspect of the invention, a surface property inspection and sorting system capable of continuously transporting, evaluating, sorting, and discharging spring-shaped members can be constructed by combining a surface property inspection and sorting apparatus and a transport device for transporting spring-shaped members subjected to surface treatment by a surface treatment apparatus to a surface property inspection device.

A fourth aspect of the invention uses a technical means whereby the surface property inspection and sorting system according to the third aspect of the invention further comprises a good part collection device for transporting the spring-shaped members judged and sorted as good parts, and a bad parts collection device for collecting the spring-shaped members judged and sorted as bad parts.

Using the fourth aspect of the invention, good parts can be quickly fed out to the next process step by the good parts collection device and bad parts only can be sorted and collected by the bad part collection device, therefore the sorting operation can be efficiently conducted.

An fifth aspect of the invention uses a technical means whereby in the surface property inspection and sorting system according to the third aspect of the invention, the transport device comprises a conveyor belt and partitioning members for partitioning the position on the conveyor belt where the spring-shaped members are loaded.

As in the fifth aspect of the invention, spring-shaped members can be reliably transported one at a time at a predetermined timing by partitioning the transport device conveyor belt using a partitioning means. In addition, there is no need to provide a member for holding the spring-shaped member prior to disposing it in the surface property inspection and sorting apparatus, thus allowing the apparatus to be simplified.

An sixth aspect of the invention is a surface property inspection and sorting method using a technical means whereby providing the surface property inspection and sorting apparatus according to the first or second aspect of the invention; guiding the spring-shaped members by a guide member so that the spring-shaped members, which have been surface treated by the surface treatment apparatus, pass through the surface property inspection device without stopping; pass/fail judging using the surface property inspection device by comparing a representative value with pre-set threshold values, the representative value being obtained from the output signals while the spring-shaped members are passing through the inspection detector; and sorting the spring-shaped members between good parts and bad parts based on a pass/fail judgment made by the surface property inspection device.

In the sixth aspect of the invention, using a surface property inspection and sorting apparatus, the spring-shaped members are passed through the inspection detector without stopping, and the spring-shaped member surface property is evaluated and a pass/fail judgment made by the surface property inspection device, therefore the time for evaluating the spring-shaped member surface property and making a pass/fail judgment can be shortened. This makes it possible to evaluate spring-shaped member M surface property and make pass/fail judgments in a manner suited to short cycle time. It also enables a reliable selection between good and bad spring-shaped member parts using a sorting means.

In an seventh aspect of the invention, a technical means is used whereby in the surface property inspection and sorting method according to the sixth aspect of the invention, the representative value is calculated by integrating the output signal from the AC bridge circuit while the spring-shaped member is passing through the inspection detector.

Using integral values of the output value as a threshold value and a representative value for comparison to a threshold value, as in the seventh aspect of the invention, enables a reduction in the variability of values caused by the state of passage etc. of the spring-shaped members inside the inspection, so a more accurate measurement and better pass/fail judgment can be made.

In an eighth aspect of the invention, a technical means is used whereby in the surface property inspection and sorting method according to the sixth or seventh aspect of the invention, the pass/fail judging step is carried out in a state that a reference sample is disposed on the reference detector, and the reference sample has same structure as the spring-shaped member for which the surface property is being evaluated.

According to the eighth aspect of the invention, the reference sample used to detect the reference state in the reference detector has the same structure as the spring-shaped member for which surface property is being evaluated, therefore even if output values fluctuate due to changes in the inspection environment such as temperature, humidity, and magnetism, the effects thereof will be the same as on the item being inspected. Fluctuations in output values caused by changes in the inspection environment such as temperature, humidity, or magnetism can thus be canceled out, and measurement accuracy improved. Here the term "same structure" means same materials and shape, whether or not a surface treatment is applied.

In a ninth aspect of the invention, a technical means is used whereby in the surface property inspection and sorting method of any one of the sixth through eighth aspects of the invention, the evaluation apparatus further comprises a memory device for correlating identifying information for each spring-shaped member and inspection data for the surface property of said spring-shaped members.

According to the ninth aspect of the invention, identifying information such as manufacturing number, history, etc. for each sample can be correlated to inspection data such as measurement values, pass/fail judgment results, measurement date and time, inspection state, etc. and stored, therefore the surface treatment state of inspected spring-shaped members can be made traceable after distribution, and traceability can be assured.

BRIEF DESCRIPTION OF FIGURES

FIGS. 9A and 9B are explanatory diagrams showing a variant example of a sorting means.

EMBODIMENTS

Figure 1A:
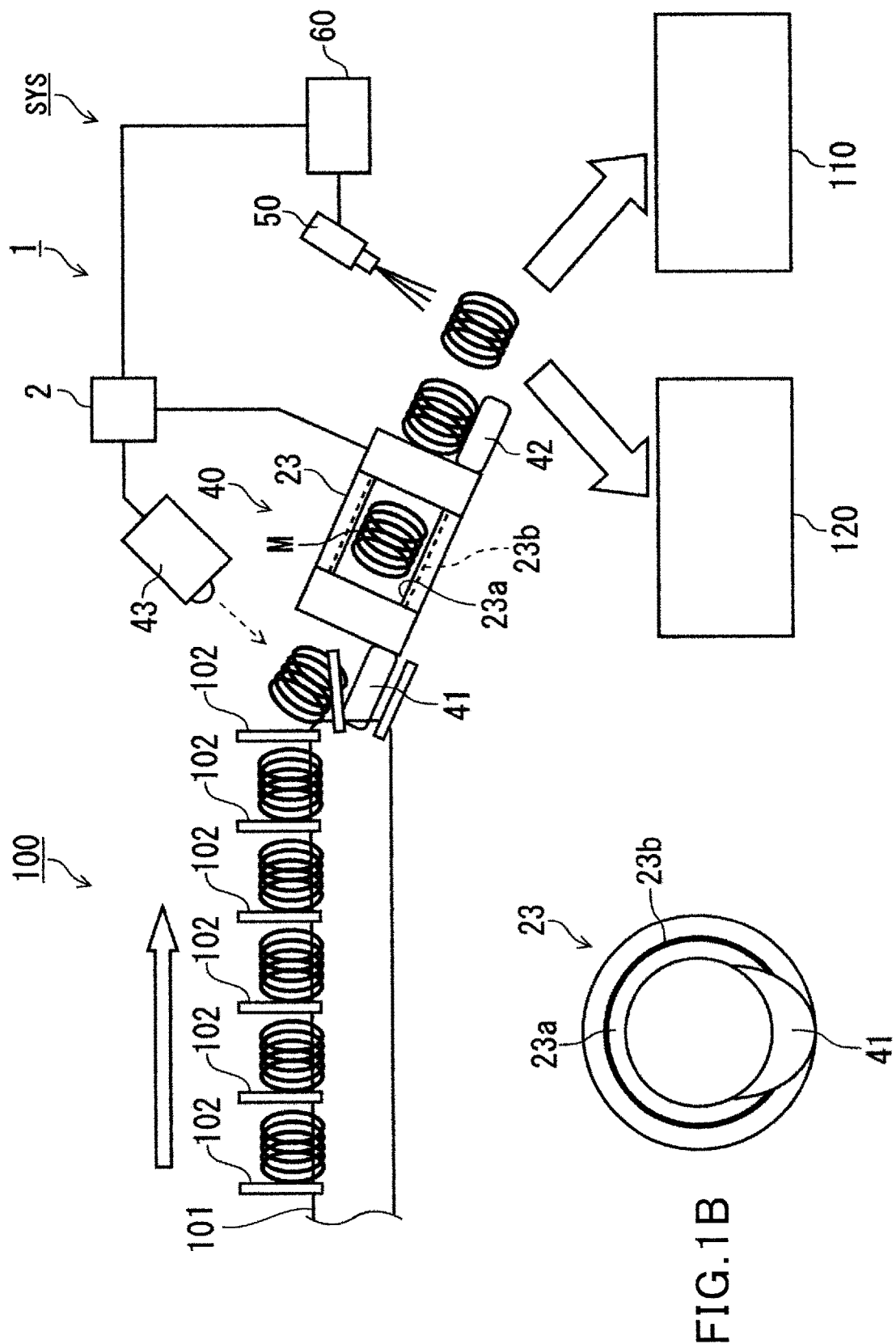
FIG. 1A is an explanatory drawing schematically showing the constitution of a surface property inspection and sorting apparatus and surface property inspection and sorting system and is an explanatory diagram of a partially transparent side elevation.
Figure 1B:
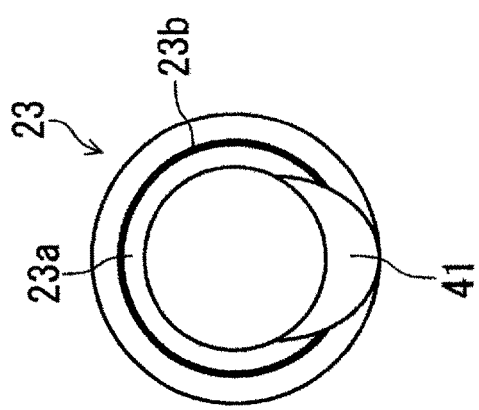
FIG. 1B is an explanatory drawing schematically showing the constitution of a surface property inspection and sorting apparatus and surface property inspection and sorting system and is a plan view seen from the upstream side in the direction of spring-shaped member transport.

The surface property inspection and sorting apparatus 1 evaluates the surface properties of a spring-shaped member M which has been surface treated by a surface treatment apparatus such as a shot-peening apparatus and transported by a transport device, then makes a pass/fail judgment and sorts into good and bad parts based on that determination result, and transports the members. As shown in FIGS. 1A and 1B, the surface property inspection and sorting apparatus 1 comprises a surface property inspection device 2, a measuring member 40 for measuring the surface properties of the spring-shaped member M, and a sorting means 50 for sorting good and bad spring-shaped member M parts. Note that for explanatory purposes, in FIGS. 1A and 1B the inspection detector 23 is shown transparently so that the condition of the spring-shaped member M passing through it can be easily understood; the connection state between the surface property inspection device 2 and the control device 60 is shown schematically.

The measuring member 40 comprises: an inspection detector 23 with which the surface property inspection device 2 is equipped, a guide member 41 for guiding spring-shaped members M into the inspection detector 23, a transport member 42 for guiding spring-shaped members discharged from the inspection detector 23 into a sorting means 50, and a sensing device 43 for sensing that spring-shaped members M have passed through the guide member 41 and been guided into the inspection detector 23.

Figure 2A:
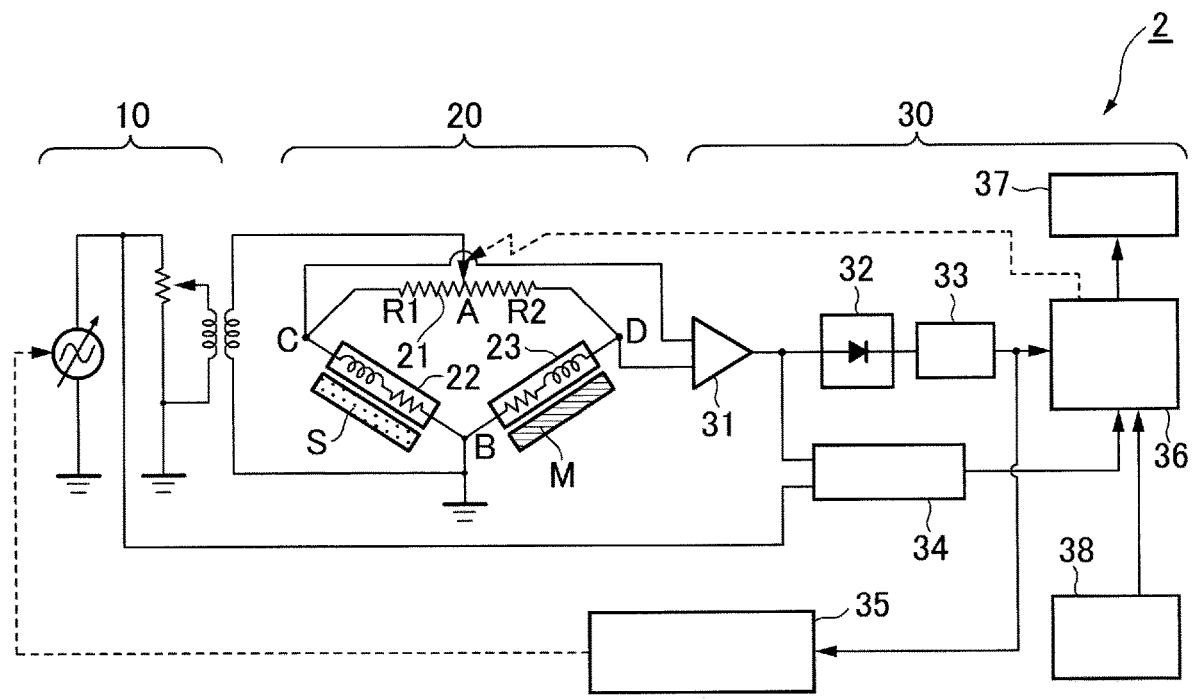
FIG. 2A is an explanatory diagram showing the circuit configuration of a surface property inspection device.
Figure 2B:
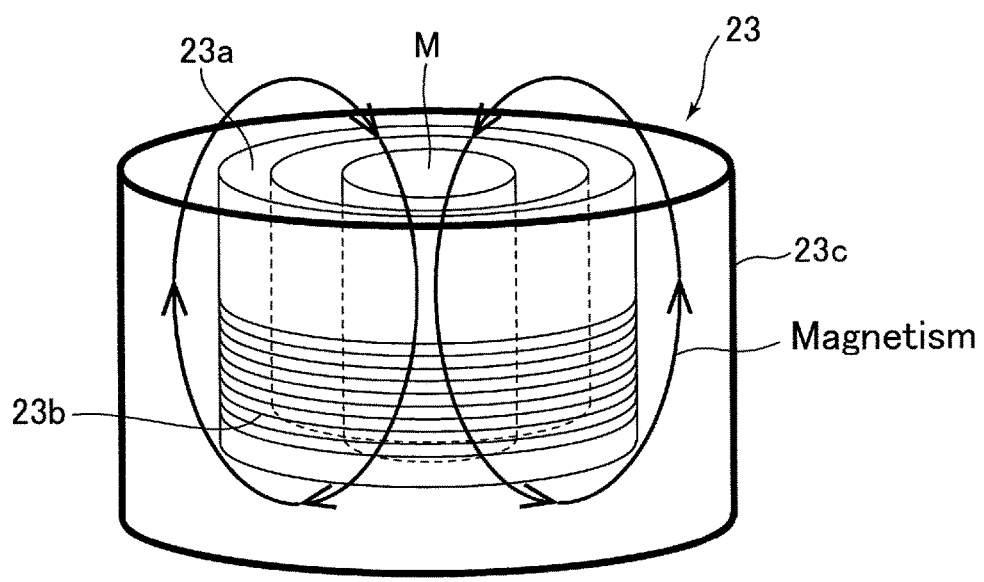
FIG. 2B is a transparent explanatory diagram showing the constitution of a surface property inspection device inspection detector disposed on a measured member.

The inspection detector 23, as shown in FIG. 2B, comprises a cylindrical core 23a formed to cover the entirety of the spring-shaped member M, and a coil 23b wound around the outer perimeter surface of the core 23a. The inspection detector 23 consists of a non-magnetic material such as resin, and is formed so that spring-shaped member M can pass through its interior. This coil 23b is wound to surround and oppose the surface property inspection area of the spring-shaped member. Surrounding the surface property inspection area of the spring-shaped member here includes the meaning of exciting eddy currents in the surface property inspection area by enveloping (surrounding in an enveloping manner) at least a part of the surface property inspection area. The length of the coil 23b is appropriately set so that output values can be appropriately extracted according to the speed at which the spring-shaped members M transit the inspection detector 23.

The inspection detector 23 comprises the circuit shown in FIG. 2A, described below. Because the inspection detector 23 has the feature of capturing eddy current reaction with high precision to evaluate surface properties, it is preferably disposed relative to the spring-shaped member M so that eddy currents flow in the region where surface properties are to be inspected.

I.e., it is preferable for the direction of winding in the coil 23b to be disposed in the same direction as the direction in which one wishes the eddy current to flow. The coil 23b should be disposed so that its winding direction is essentially perpendicular to the spring-shaped member M axis. This results in a magnetic field loop in the spring-shaped member M winding direction, therefore an eddy current can be efficiently excited, and surface properties of the entire spring-shaped member M can be inspected in one pass.

As shown in FIG. 1B, the guide member 41 is formed into a shape having essentially the same curved shape as a part of the inside perimeter surface of the core 23a, to match the shape of the coil-shaped member M, such that the coil-shaped member M can be smoothly guided into the inspection detector 23. The guide member 41 can be integrally formed as a part of the inspection detector 23.

A laser position sensor can, for example, be used as the sensing device 43. The sensing device 43 is connected to a judgment means 36 in the surface property inspection device 2 so that a sensing signal sensing that the spring-shaped member M has passed through the guide member 41 and has been guided into the inspection detector 23 can be transmitted.

In the present embodiment a jet nozzle capable of blowing spring-shaped members M by jetting compressed air to change their transport direction was used as the sorting means 50.

A control device 60 is connected to the judgment means 36 in the surface property inspection device 2, and controls the operation of the sorting means 50 based on the pass/fail judgment results for the surface treatment state of the spring-shaped member M by the judgment means 36.

As shown in FIGS. 1A and 1B, the surface property inspection and sorting apparatus 1 can, in combination with a transport device 100 for transporting spring-shaped members M treated by a surface treatment apparatus such as a shot-peening apparatus toward the surface property inspection and sorting apparatus 1, a good part collection device 110 for collecting spring-shaped members M sorted by the sorting means 50 as good parts or transporting them to the next process step, and a bad part collection device 120 for collecting spring-shaped members M sorted by the sorting means 50 as bad parts, form a surface property inspection and sorting system SYS. Here the surface property inspection and sorting apparatus 1 is disposed at an incline, facing diagonally downward from the direction of transport so that spring-shaped members M can move by gravity through the measuring member 40 in the sequence of the guide member 41, the inspection detector 23, and the transport member 42.

A constitution is preferably used in which a conveyor belt 101 and multiple pins 102, being partitioning members for partitioning the positions for loading the spring-shaped members M, are provided as a transport device 100, and one spring-shaped member M each is disposed between adjacent pins 102. This enables the spring-shaped members M to be reliably transported one at a time at a predetermined timing. In addition, there is no need to provide a member for holding the spring-shaped member M prior to disposing it in the surface property inspection and sorting apparatus 1, thus allowing the apparatus to be simplified. Here the guide member 41 is disposed close to the position at which the conveyor belt 101 inverts.

The good part collection device 110 comprises a collection box for collecting good parts, and a conveyor or the like, and is installed below in the direction extending from the transport member 42. The bad part collection device 120 comprises a holding box for holding bad parts, located in front of and below the good part collection device 110.

With such a surface property inspection and sorting system SYS, a transport device 100 is provided, enabling the construction of a surface property inspection and sorting system capable of continuously transporting, evaluating, sorting, and discharging spring-shaped members M. Also, good parts can be collected and quickly transported to the next process step by the good part collection device 110, and bad parts only can be sorted and collected by the bad part collection device 120, therefore the sorting operation can be efficiently conducted.

(Surface Property Inspection Apparatus)

Next we explain the detailed constitution of the surface property inspection device 2. As shown in FIGS. 2A and 2B, the surface property inspection device 2 according to the present embodiment of the invention comprises an AC power supply 10, an AC bridge circuit 20, and an evaluation apparatus 30.

The AC power supply 10 is capable of supplying AC power at a variable frequency to AC bridge circuit 20.

The AC bridge circuit 20 comprises a variable resistor 21, an inspection detector 23 formed to enable the disposition of a coil for exciting an eddy current in the spring-shaped member M, an inspection detector 23, and a reference detector 22, which has the same constitution as the inspection detector 23 and is formed so that a reference sample S of the same structure as the spring-shaped member M can be disposed therein, for detecting a reference state serving as reference for comparison with the output from the inspection detector 23. Here the term "same structure as the spring-shaped member M" means the same materials and shape, irrespective of surface treatment.

The variable resistor 21 is constituted to variably split the distribution ratio γ of resistor $R_A$ into a resistance R1 and a resistance R2. The resistor R1 and resistor R2, together with the reference detector 22 and the inspection detector 23, constitute a bridge circuit. In the present embodiment, the point A dividing the resistor R1 and the resistor R2, and the point B between the reference detector 22 and the inspection detector 23, are connected to the AC power supply 10 in the evaluation device 30, and the point C between the resistor R1 and the reference detector 22 and the point D between the resistor R2 and the inspection detector 23 are connected to the amplifier 31. To reduce noise, the reference detector 22 and the inspection detector 23 sides are grounded.

The evaluation device 30 comprises an amplifier 31 for amplifying a voltage signal output from the AC bridge circuit 20, an absolute value circuit 32, a low-pass filter (LPF) 33, a phase comparator 34 for comparing the phases between the AC voltage supplied from AC power supply 10 and the voltage output from amplifier 31, a frequency adjuster 35 for adjusting the frequency of the AC voltage supplied from the AC power supply 10, a judgment means 36 for performing a non-equilibrium adjustment to optimize the split between R1 and R2 and judge the pass/fail state of the surface of the spring-shaped member M based on the output from the LPF 33, a display means 37 for displaying and warning of the judgment results by judgment means 36, and a temperature measurement means 38 for detecting the temperature at the evaluation position. A memory device is also provided, either inside the judgment means 36 or in an area not shown.

The amplifier 31 is connected to points C and D and receives an input of the difference in potential between point C and point D. The absolute value circuit 32 and the LPF 33 are connected in that order to the judgment means 36. The phase comparator 34 is connected to the AC power supply 10, the amplifier 31, and the judgment means 36. The frequency adjuster 35 is connected to the AC power supply 10 and the amplifier 31. The judgment means 36, by outputting a control signal, can change the position of point A in the AC bridge circuit 20, i.e., it can change the distribution ratio γ between the resistor R1 and the resistor R2, thus executing the variable resistance setting step described below.

The temperature measurement means 38 is formed of a non-contacting infrared sensor or thermocouple or the like, and outputs a signal for the surface temperature of the spring-shaped member M to the judgment means 36. When the temperature of the spring-shaped member M detected by the temperature measurement means 38 is within a predetermined range, the judgment means 36 makes a pass/fail judgment of the spring-shaped member M surface treatment state; when the temperature of the spring-shaped member M detected by the temperature measurement means 38 is outside a predetermined range, no pass/fail judgment is made of the spring-shaped member M surface treatment state. Thus when the temperature of the spring-shaped member M affects the accuracy of inspection, an arrangement can be made not to make a pass/fail judgment of the surface treatment state of the spring-shaped member, therefore high precision inspection can be performed. Here a constitution can be adopted in which the temperature at evaluation position Ts is measured with a thermocouple or the like, and a judgment is made of whether or not to make a pass/fail judgment of the spring-shaped member M surface treatment state as a representative temperature for the spring-shaped member M surface temperature.

AC power at a predetermined frequency is supplied to the coil 23B by the AC power supply 10; an AC magnetic field is generated when the spring-shaped member M is passed through the inspection detector 23 in such a way that the inspection detector 23 opposes the inspection target surface of the spring-shaped member M, and an eddy current flowing in a direction intersecting the AC magnetic field is excited on the surface of the spring-shaped member M. Since eddy currents change in response to electromagnetic properties of the residual stress layer, the phase and amplitude (impedance) of the output waveform output from amplifier 31 changes in response to properties of the residual stress layer (the surface treatment state). Electromagnetic properties of the surface treatment layer can be detected using these changes in output waveform to perform an inspection.

As shown in FIG. 2B, a magnetic shield 23c, outside the inspection detector 23 and disposed to surround the spring-shaped member M, may also be provided. External magnetism is blocked by the magnetic shield 23c, therefore detection sensitivity to electromagnetic properties can be improved, and detection sensitivity to electromagnetic properties corresponding to surface treatment state improves, so the surface treatment state of a spring-shaped member M can be more accurately evaluated.

(Output from the AC Bridge Circuit)

Figure 3:
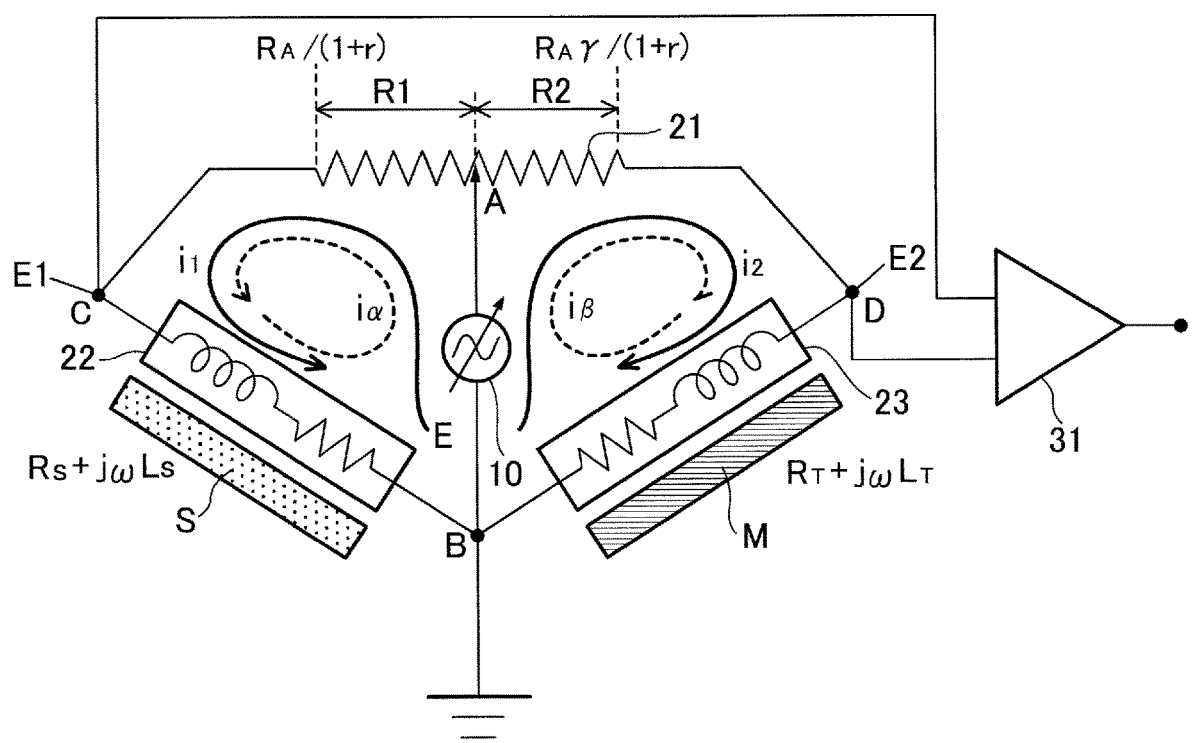
FIG. 3 is an equivalent circuit diagram explaining the output from an AC bridge circuit.

Next, referring to the equivalent circuit in FIG. 3, we explain the output from AC bridge circuit 20, adjusted to a non-equilibrium state. A reference test piece S for outputting a reference output is placed in close proximity to the reference detector 22, and a spring-shaped member M for which a pass/fail judgment of the surface treatment state is required is placed in close proximity to the inspection detector 23. Here the reference test piece S has the same structure as the spring-shaped member M, and preferably uses an untreated part on which no surface treatment has been performed.

If the distribution ratio of variable resistor $R_A$ is $\gamma$, resistor R1 is $R_A/(1+\gamma)$, and resistor R2 is $R_A\gamma/(1+\gamma)$. The reference detector 22 impedance is assumed to be $R_S+j\omega L_S$, and the impedance of the inspection detector 23 is assumed to be $R_T+j\omega L_T$. Assuming an electrical potential E at point A, the excitation currents flowing on each side of the bridge with each test piece (reference test piece S, spring-shaped member M) not placed in proximity to the reference detector 22 and the inspection detector 23 are respectively $i_1$ and $i_2$; the degree of magnetism is changed by placing each test piece in proximity to the reference detector 22 and the inspection detector 23, and the currents flowing in response to the degree of that change are respectively $i\alpha$ and $i\beta$. The potentials E1 and E2 and excitation currents $i_1$, and $i_2$ on the reference detector 22 and the inspection detector 23 in this instance are expressed by Expressions (1) through (4) below.

(Exp. 1)
$$E1 = (R_S + j\omega L_S)(i\alpha + i_1) \quad (1)$$

(Exp. 2)
$$E2 = (R_T + j\omega L_T)(i\beta + i_2) \quad (2)$$

(Exp. 3)
$$i_1 = \frac{E}{\frac{R_A}{1+\gamma} + R_S + j\omega L_S} \quad (3)$$

(Exp. 4)
$$i_2 = \frac{E}{\frac{R_A\gamma}{1+\gamma} + R_T + j\omega L_T} \quad (4)$$

The voltage output to the amplifier 31 is the differential between E1 and E2, and is expressed by the following expression.

(Exp. 5)
$$E2-E1 = [\{(R_T+j\omega L_T)i\beta - (R_S+j\omega L_S)i\alpha\} + \{(R_T+j\omega L_T)i_2 - (R_S+j\omega L_S)i_1\}] \quad (5)$$

The following expression is derived from Expressions (3) through (5).

(Exp. 6)
$$E2 - E1 = \left[ \{(R_T + j\omega L_T)i\beta - (R_S + j\omega L_S)i\alpha\} + \right. \\ \left. \left\{ (R_T + j\omega L_T)\frac{E}{\frac{R_A\gamma}{1+\gamma} + R_T + j\omega L_T} - (R_S + j\omega L_S)\frac{E}{\frac{R_A}{1+\gamma} + R_S + j\omega L_S} \right\} \right] \quad (6)$$

We consider each of the differential voltage components by separating the right side of Exp. (6) into the following components A and B.

Component A:

$$(R_T+j\omega L_T)i\beta - (R_S+j\omega L_S)i\alpha$$

Component B:

$$(R_T + j\omega L_T)\frac{E}{\frac{R_A\gamma}{1+\gamma} + R_T + j\omega L_T} - (R_S + j\omega L_S)\frac{E}{\frac{R_A}{1+\gamma} + R_S + j\omega L_S}$$

Component A comprises each of the detector components: (Rs+jωLs), (RT+jωLT), and the electrical current amounts, which change when each of the test pieces is placed in proximity to each detector: $i\alpha$ and $i\beta$. The amounts of $i\alpha$ and $i\beta$ vary with the amount of magnetism passing through the test piece due to electromagnetic properties such as magnetic permeability and electrical conductivity. It is therefore possible to change $i\alpha$ and $i\beta$ by changing the excitation currents $i_1$ and $i_2$, which control the amount of magnetism produced by each detector. According to Expressions (3) and (4), the excitation currents $i_1$ and $i_2$ change depending on the variable resistor distribution ratio $\gamma$, therefore the size of component A can be changed by adjusting the variable resistor distribution ratio $\gamma$.

Component B comprises each of the detector components: (Rs+jωLs), (RT+jωLT), and the resistance parameter divided by the variable resistor distribution ratio $\gamma$. Therefore the size of component B can be changed by adjusting the variable resistor distribution ratio $\gamma$ in the same way as for component A.

When AC power at a predetermined frequency is supplied to the inspection detector 23 coil 23b by the AC power supply 10, and the spring-shaped member M passes through the inspection detector 23, an eddy current flowing in a direction intersecting the AC magnetic field is excited on the surface of the spring-shaped member M. Since eddy currents change in response to electromagnetic properties of the residual stress layer, the phase and amplitude (impedance) of the output waveform output from the amplifier 31 changes in response to properties of the residual stress layer (the surface treatment state). Electromagnetic properties of the residual stress layer can be detected using these changes in output waveform, and an inspection of the surface treatment state thus performed.

Signals output from the bridge amplifier 31 extract the differential surface area between the voltage waveforms of reference detector 22 and the inspection detector 23, and form a circuit for holding fixed the current flowing in the detector (excitation current), therefore the extracted voltage signals can be thought of as a power signal. Also, power supplied to the detector is always constant, and magnetic energy supplied to the spring-shaped member M can in this way be kept constant.

(Surface Property Inspection Method)

Figure 4:
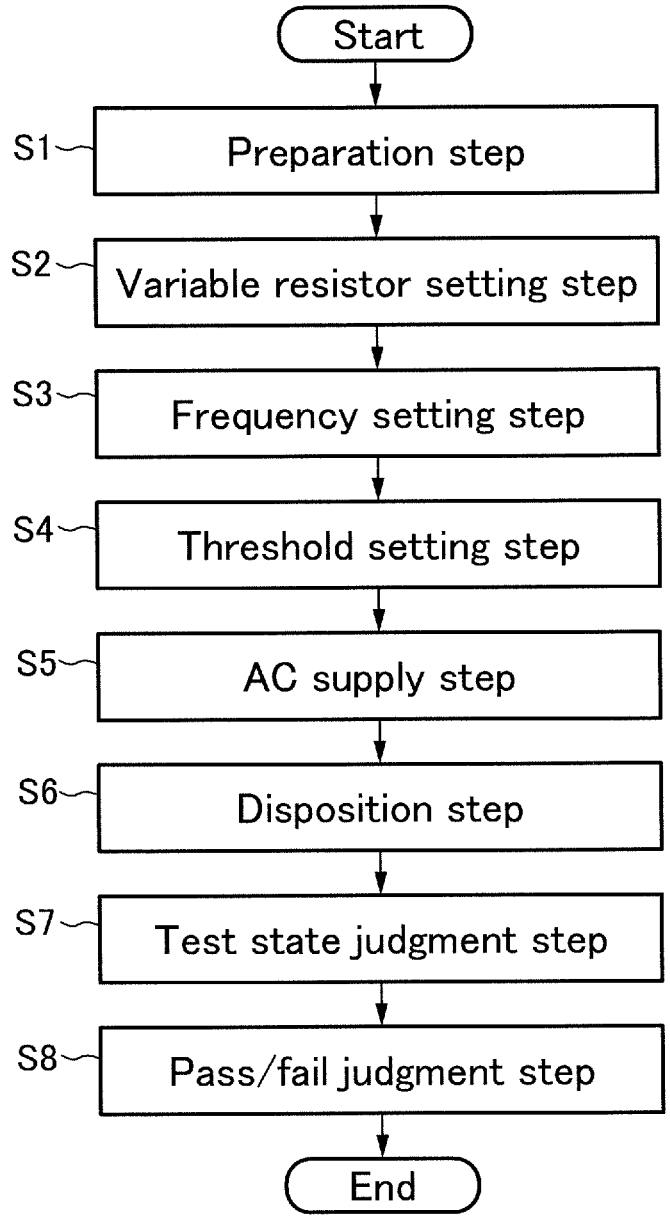
FIG. 4 is a flow chart showing a surface property inspection method.

Next, referring to FIG. 4, we explain a spring-shaped member M surface property inspection method using the surface property inspection device 2.

First, the surface property inspection device 2 and a reference sample S are prepared in preparatory step S1.

Next, a variable resistor setting step S2 is performed. In the variable resistor setting step S2, AC power is first supplied from the AC power supply 10 to the AC bridge circuit 20. In this state, the distribution ratio γ of the variable resistor 21 is adjusted to achieve a high test piece detection sensitivity by the surface property inspection device 2. I.e., the distribution ratio γ of the variable resistor 21 is adjusted so that the output signal of the AC bridge circuit 20 is reduced without placing the test piece in proximity to the inspection detector 23. By thus setting the variable resistor 21, the difference in output signal is increased between the case when the surface treatment state of a unit under test M brought into proximity with the inspection detector 23 is poor and the case when the surface treatment state is good, and detection accuracy can be raised.

Specifically, the voltage amplitude of the output signal from the AC bridge circuit 20 or the voltage output from the LPF 33 are monitored using a display device with a waveform display function such as an oscilloscope (e.g., the one comprising judgment means 36), and the distribution ratio γ is adjusted so that output diminishes. The distribution ratio γ of the variable resistor 21 is preferably adjusted and set so that the output reaches a minimum value or a local minimum value (local equilibrium point).

Adjustment of the variable resistor 21 distribution ratio γ is performed in order to improve inspection accuracy by increasing the output differential corresponding to the difference in surface states by reducing the differential voltage (E2−E1). As described above, components A and B are changed by adjusting the distribution ratio γ, therefore the variable resistor 21 distribution ratio γ can be adjusted in response to the impedances ($R_S+j\omega L_S$) and ($R_T+j\omega L_T$) of the reference detector 22 and the inspection detector 23, thereby reducing the differential voltage (E2−E1), which is the output from AC bridge circuit 20. Thus the difference in properties between the reference detector 22 and the inspection detector 23 can be reduced and at least a little more of the inherent properties of the unit under test M can be extracted, improving detection accuracy.

In frequency setting step S3, AC power is supplied from the AC power supply 10 to the AC bridge circuit 20 with the reference sample S brought into proximity to the inspection detector 23; the frequency of AC power supplied to the AC bridge circuit 20 by the frequency adjuster 35 is varied, and the voltage amplitude output from the AC bridge circuit 20 or the voltage output from LPF 33 are monitored.

The frequency adjuster 35 outputs a control signal to the AC power supply 10 to achieve the initial frequency f1 set in the frequency adjuster 35, and the output voltage Ef1 from the amplifier 31 at frequency f1 is input to the frequency adjuster 35 and stored. Next, a control signal is output to the AC power supply 10 to reach a frequency f2 such as 100 Hz, which is higher than frequency f1 by a predetermined value, and an output voltage Ef2 from the amplifier 31 at frequency f2 is input to the frequency adjuster 35 and stored.

Next, a comparison is made between Ef1 and Ef2; if Ef2>Ef1, a control signal is output so as to reach a frequency f3, higher by a predetermined value than frequency f2; an output voltage Ef3 from amplifier 31 at frequency f3 is input to the frequency adjuster 35 and stored. Ef2 and Ef3 are then compared. This is repeated, and the frequency fn when Efn+1<Efn, i.e. the frequency fn at which output is maximum, is set as the frequency used in the frequency setting step S4 and the AC supply step S5. Thus the frequency can be set with a single operation to increase the frequency output from the AC bridge circuit 20 in response to spring-shaped members M with different impedances due to differences in surface treatment state, shape, and so forth. The optimal frequency varies depending on the material, shape, and surface treatment state of the spring-shaped member M, but when these are known in advance, setting the frequency is unnecessary. Thus a sensitive response to changes in the surface treatment state is possible, and inspection sensitivity can be improved.

Here the frequency setting step S3 can also be executed before the variable resistor setting step S2.

A threshold value used to make a pass/fail judgment on the surface condition of the spring-shaped member M is set in the threshold value setting step S4. Here we explain a method for setting a pre-set threshold value used for inspecting the spring-shaped member M.

In the threshold setting step S4, the reference sample S is brought into proximity with the reference detector 22; AC power at the frequency set in the frequency setting step S3 is supplied from the AC power supply 10 to the AC bridge circuit 20, and the reference sample S is passed through the inspection detector 23. At this point it is desirable to match the transit speed of the reference sample S to the transit speed during actual inspection; for example, the reference sample S can be placed in the guide member 41 and allowed to move inside the inspection detector 23 by gravity. The voltage output from the AC bridge circuit 20 is amplified by the amplifier 31; full wave rectification is performed by the absolute value circuit 32; a DC conversion is performed in the LPF 33, and the result is output to the judgment means 36.

Figure 5:
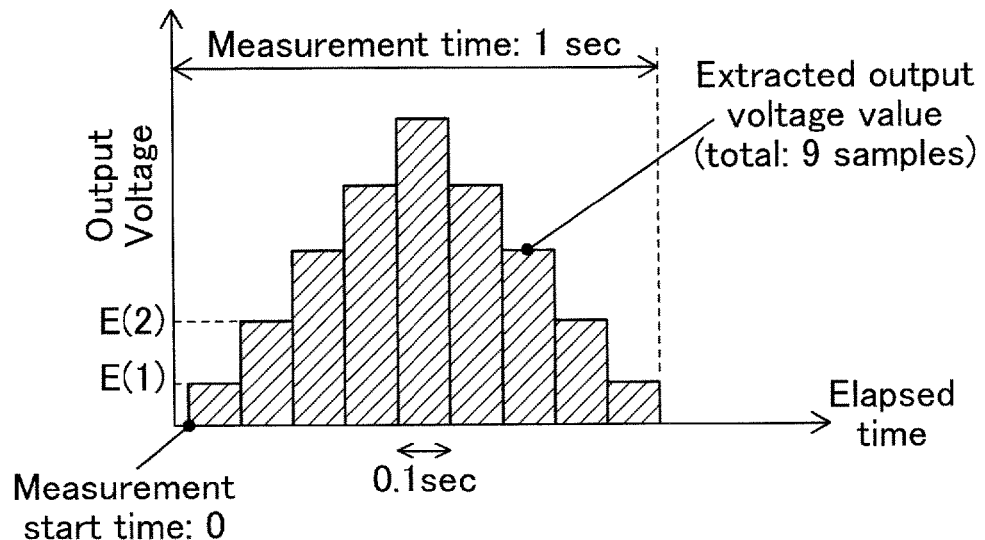
FIG. 5 is an explanatory diagram schematically showing the change in output value when a spring-shaped member passes through an inspection detector.
Figure 6:
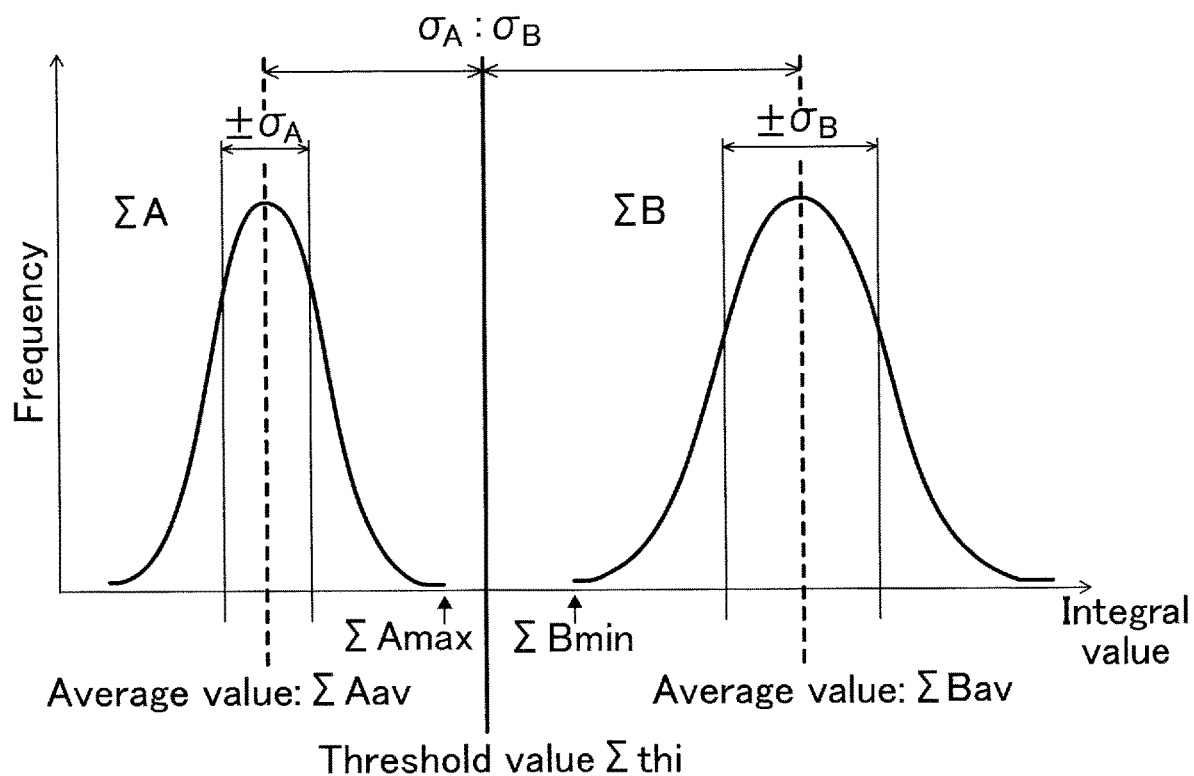
FIG. 6 is an explanatory diagram explaining a method for setting a threshold value.

FIG. 5 schematically shows changes in the output value from the AC bridge circuit when the spring-shaped member M passes through the inspection detector 23. The output value from the AC bridge circuit 20 is extracted and stored at a predetermined sampling interval. The sampling interval takes into account the transit time for the spring-shaped member M. For example, an interval is set which allows for measurement of ten or more points during transit. Shown here is the case when an output value is extracted with a spring-shaped member M transit time, e.g. measurement time, of 1 second and a sampling interval of 0.1 seconds. Here, because the output rises as the area inside the inspection detector 23 where the spring-shaped member M is located increases, the middle portion of the measurement time has the largest output values.

Stored output values are time-integrated at the sampling interval, and the output integral value Σ is calculated and stored in the judgment means 36. Here the sampling interval is 0.1 sec, therefore if the output values at each sampling time are E(1), (2), . . . E(9), then Σ is calculated as Σ=E(1)×0.1+E(2)×0.1+ . . . E(9)×0.1.

Approximately 10 to 10+ untreated spring-shaped members and post-surface treatment spring-shaped members are respectively prepared, and distribution data for the integral values thereof is acquired.

Figure 7:
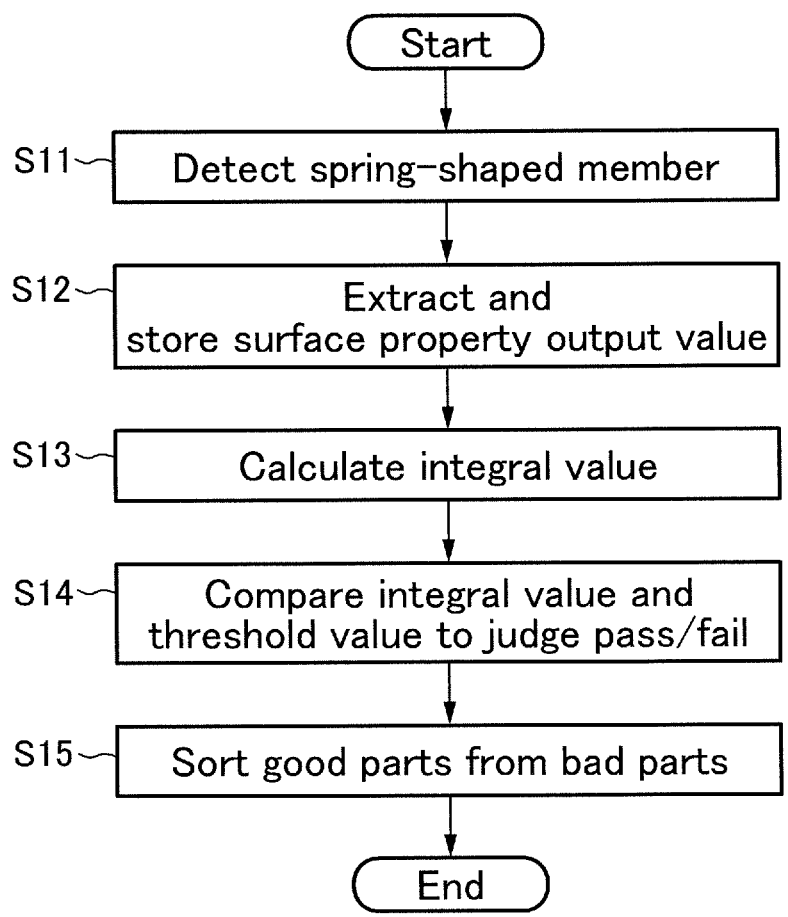
FIG. 7 is a flow chart showing a surface property inspection and sorting method.

The threshold value Σthi is obtained and set by the following expression, based on the integral value ΣA of the output signal when an untreated spring-shaped member M is passed through the inspection detector 23, and on the integral value ΣB of the output signal when a post-treatment spring-shaped member M with a good surface state is passed through the inspection detector 23, taking into account variability in the respective output signals. FIG. 7 schematically shows the distribution of integral values ΣA for the untreated spring-shaped member output signal and of the integral values ΣB for the post-treatment spring-shaped member output signal.

$$\Sigma thi = (\Sigma Aav \cdot \sigma B + \Sigma Bav \cdot \sigma A)/(\sigma A + \sigma B) \quad \text{(Exp. 7)}$$

ΣAav: average value of integral value ΣA; ΣBav: average value of integral value ΣB; σA: standard deviation of integral value ΣA; σB: standard deviation of integral value ΣB.

This allows for the setting of a high precision, appropriate threshold value using a small number of measurements. This threshold value ΣThi is set as the threshold value and stored in the judgment means 36. Here the threshold value Σthi satisfies the relationship ΣAmax<Σthi<ΣBmin between the ΣA maximum value ΣAmax and minimum value ΣBmin.

Note that even when the relationship above is not satisfied, an appropriate threshold value Σthi can be set by taking into account factors such as variability in the integral value ΣA and the integral value ΣB, and whether there are unique measurement values greatly divergent from the distribution, etc. For example, there is a method by which multiple measurements are made of the untreated and treated states of the same spring-shaped members and the Σthi is recalculated using these results.

In the AC supply step S5, AC power at the frequency set in the frequency setting step S3 is supplied from the AC power supply 10 to the AC bridge circuit 20. Here the reference sample S is in close proximity to the inspection detector 23.

Here, in disposition step S6, the spring-shaped member M for which a pass/fail judgment is to be made on the surface treatment state is passed through the inspection detector 23, and an eddy current is excited in the spring-shaped member M. At this point a voltage output signal is output from the AC bridge circuit 20; the output signal is amplified by the amplifier 31, full wave-rectified by the absolute value circuit 32, and converted to DC by the LPF 33.

The temperature measurement means 38 measures the surface temperature of the spring-shaped member M before or while it is being passed through the inspection detector 23 and outputs a spring-shaped member M surface temperature signal to the judgment means 36.

In the test state judgment step S7, a comparison is made by the phase comparator 34 between the AC power waveform supplied from the AC power supply 10 and the AC voltage waveform output from the AC bridge circuit 20, and their phase differences are detected. By monitoring this phase difference a judgment can be made as to whether or not the inspection state is favorable (e.g., that there is no positional offset between the inspection detector 23 and the spring-shaped member M). Even if the outputs from the AC bridge circuits 20 are the same, the inspection state changes when there are large changes in phase difference, and a judgment can be made that the inspection may not be correctly implemented. Also, when the temperature of the spring-shaped member M detected by the temperature measurement means 38 is within a predetermined range, the judgment means 36 makes a pass/fail judgment of the spring-shaped member M surface treatment state; when the temperature of the spring-shaped member M detected by the temperature measurement means 38 is outside a predetermined range, no pass/fail judgment is made of the spring-shaped member M surface treatment state. Here the predetermined temperature range is one in which there is substantially no effect on the inspection from temperature changes in the spring-shaped member M; for example, it may be set to 0 to 60° C. Various measures can be undertaken when the temperature of the surface of the spring-shaped member M is outside a predetermined temperature range, such as standing by until the spring-shaped member M is within a predetermined temperature range, or blowing air onto the spring-shaped member M, or moving the spring-shaped member M to a different line without inspecting it.

In pass/fail judgment step S8, the signal converted to DC in the LPF 33 is input to the judgment means 36, and the judgment means 36 makes a pass/fail judgment of the surface state of the spring-shaped member M based on the input signal. I.e., this is an evaluation step for evaluating the surface properties of a spring-shaped member based on an output signal output from the AC bridge circuit 20. The judgment result by the judgment means 36 is output to the control device 60 in the surface property inspection and sorting apparatus 1. It can also be displayed by the display means 37 and a warning issued when the surface state is poor.

The pass/fail judgment of the surface treatment state of the spring-shaped member M is made by obtaining a representative value for the output characteristics using output values from the LPF 33 (in this embodiment, the integral value Σs, described below) and comparing this with the threshold value set in the threshold setting step S4. If the representative value exceeds the threshold value, the judgment means 36 judges that the surface state is good; if the representative value is at or below the threshold value, it judges that the surface state is poor.

Inspection data such as measurement values, pass/fail judgment results, measurement time, inspection state and the like (temperature, humidity, differential voltage potential ΔE described below, etc.) are correlated with identifying information for each spring-shaped member M such as lot, manufacturing number, and history and stored in the evaluation apparatus 30 judgment means 36 or a memory device, not shown, and can be called as needed. I.e., it is also acceptable for the identifying information associated with the respective measurement data to be directly or indirectly assigned to the spring-shaped member. For example, it would be acceptable to directly or indirectly display on the spring-shaped member barcodes or product control numbers associated with measurement data. By this association of measurement data with identifying markings such as bar codes, product control numbers, etc., the surface state of an inspected spring-shaped member inspected by the surface property inspection device 2 can be tracked after distribution, thereby assuring traceability.

The steps above allow for a simple and high precision inspection of the pass/fail state of the surface treatment of a spring-shaped member M. To perform continuous inspection of spring-shaped members M, a disposition step S6, inspection state judgment step S7, and pass/fail judgment step S8 are repeatedly carried out. When changing the spring-shaped member M type or the surface treatment type, the variable resistor setting step S2, frequency setting step S3, and threshold setting step S4 are again implemented.

The inspection detector 23 indirectly captures surface resistance changes by capturing changes in eddy currents flowing on the surface of the spring-shaped member M. Here, when shot-peening is performed as the surface treatment, possible factors causing changes in eddy current include deformations, structural refinement, or dislocation caused by shot-peening, but under the temperature changes occurring within the measurement environment (0° C.~40° C.), these are essentially fixed. Magnetic changes detected by the inspection detector 23 are caused by changes in the demagnetized field of eddy current flow, and since changes in eddy current flow are little affected by temperature changes in the measurement environment, effects on test accuracy from temperature changes can be minimized.

Because a reference test piece of the same structure as the spring-shaped member M is used to detect the reference state in the reference detector 22, fluctuations in output values due to changes in the inspection environment such as temperature, humidity, and magnetism, will be the same on the reference detector as on the spring-shaped member M. Fluctuations in output values caused by changes in the inspection environment such as temperature, humidity, or magnetism can thus be canceled out, and measurement accuracy improved. In particular, when an untreated part not subjected to surface treatment is used as the reference sample S, the output based on the difference relative to the spring-shaped member M can be increased, measurement accuracy can be further improved, and the threshold value more easily set, making this preferable.

When test state judgment step S7 is not implemented, the phase comparator 34 can be omitted from the surface property inspection device 2. For example, a configuration can be used in which the positional relationship between the inspection detector 23 and the spring-shaped member M is detected by a position detection means such as a laser displacement gauge, and a determination made using an optoelectric sensor (laser) or the like of whether the offset between the inspection detector 23 axis and the spring-shaped member M axis are within a predetermined range. The phase comparator 34, frequency adjuster 35, or display means 37 can be integrated into a single piece by building them into the judgment means 36, for example.

If the output from the AC bridge circuit 20 at the time of the spring-shaped member M measurement is sufficiently large, the variable resistor setting step S2 and frequency setting step S3 may be omitted. If the frequency setting step S3 is omitted, the surface property inspection device 2 can omit the frequency adjuster 35.

(Surface Property Inspection and Sorting Method)

Next, referring to FIG. 7, we use the surface property inspection and sorting apparatus 1 to explain a surface property inspection and sorting method for sorting between good and bad parts among spring-shaped members M.

First, in step S11, the spring-shaped members M transported by the conveyor belt 101 are guided by the guide member 41 to the inspection detector 23. At this point the sensing device 43 senses that the spring-shaped member M has passed through the guide member 41 and been guided into the inspection detector 23.

When the fact that the spring-shaped member M has been guided into the inspection detector 23 is sensed by the sensing device 43, an evaluation of spring-shaped member M surface properties is performed, triggered by the sensing signal sent by the sensing device 43.

First, in the succeeding step S12, output values are extracted from the inspection detector 23 at a predetermined sampling rate and stored. Here we show the case in which the spring-shaped member M transit time, which is to say the measurement time, is 1 sec, and sampling is performed at 0.1 sec intervals (FIG. 5).

In the following step S13, as in the threshold setting step S4, stored output values are time-integrated and an output integral value $\Sigma s$ is calculated.

In the following step S14, this integral value $\Sigma s$ is compared with the threshold value set in threshold setting step S4 and a pass/fail judgment is made of the spring-shaped member M (pass/fail judgment step S8).

In the following step S15, spring-shaped members M are sorted into good and bad parts. If the spring-shaped member M is judged a good part in step S14, the sorting means 50 does not operate, and the spring-shaped member M is collected by the good part collection device 110 disposed beneath an extension of the transport member 42, or is transported to the next step.

If the spring-shaped member M is judged to be a bad part in step S14, the judgment result is input to the control device 60 by the judgment means 36. The control device 60 activates the sorting means 50, causing it to jet compressed air onto spring-shaped members M which have passed the transport member 42, changing the spring-shaped member M transport direction and sending the spring-shaped member M to the bad part collection device 120.

The continuous performance of the above operations enables continuous evaluation of spring-shaped member M surface properties, pass/fail judgment, and sorting between good and bad spring-shaped member M parts.

With the surface property inspection and sorting apparatus 1, because the spring-shaped member M is passed through the inspection detector 23 without stopping, and spring-shaped member M surface properties are evaluated and a pass/fail judgment made by the surface property inspection device 2, the time for evaluating spring-shaped member M surface properties and making a pass/fail judgment can be shortened. This makes it possible to evaluate spring-shaped member M surface properties and make pass/fail judgments in a manner suited to short cycle time. It also enables a reliable selection between good and bad spring-shaped member M parts using the sorting means 50.

(Variant Examples)

Figure 8A:
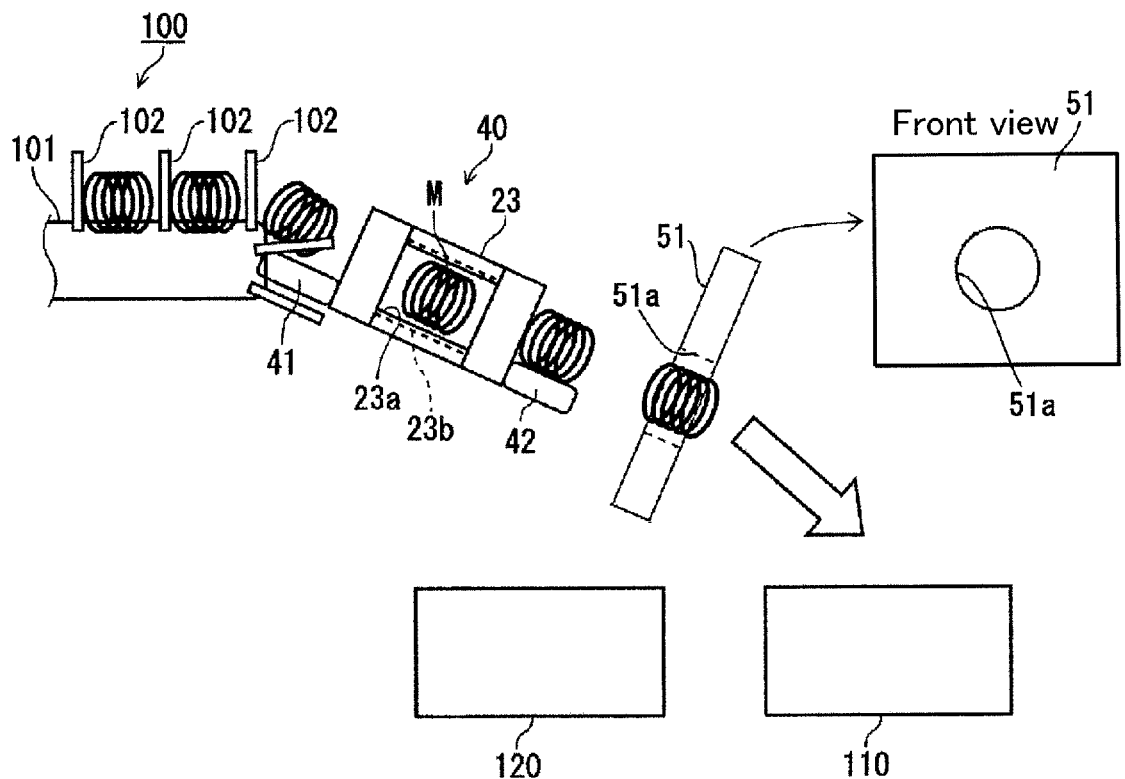
FIGS. 8A and 8B are explanatory diagrams showing a variant example of a sorting means.
Figure 8B:
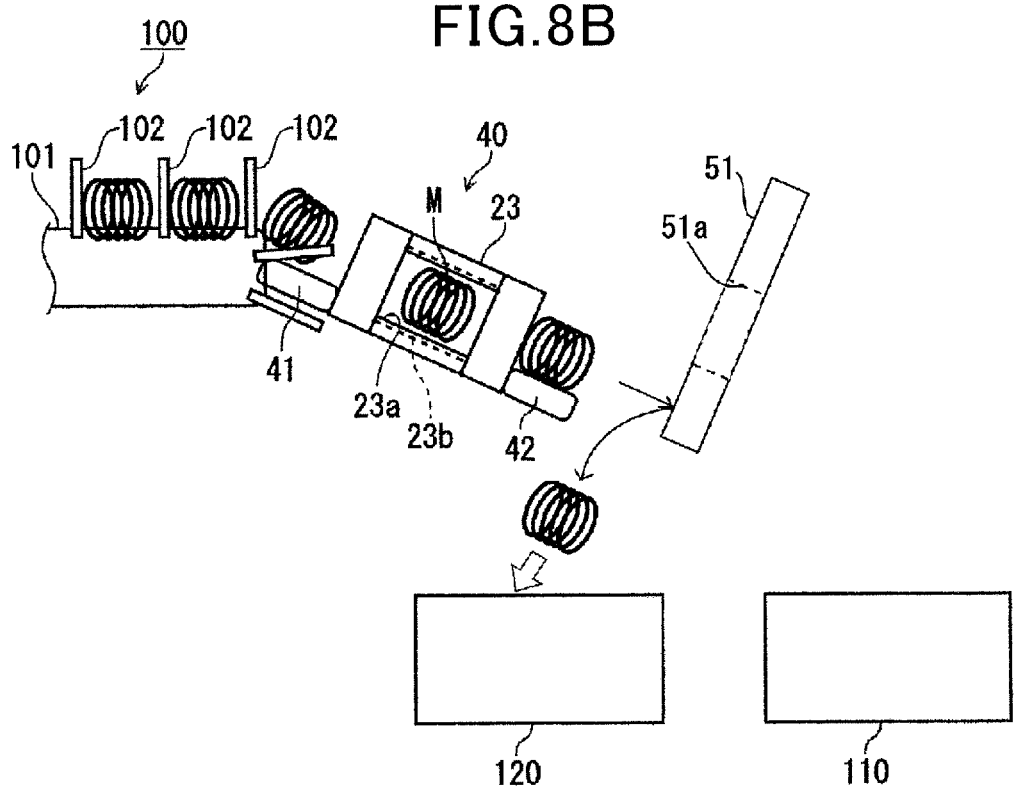

A nozzle for jetting compressed air was used as the sorting means 50, but the invention is not limited thereto. For example, as shown in FIGS. 8A and 8B, a form could also be adopted in which there is a sorting member 51 with a hole portion 51a through which the spring-shaped member M can pass, and a moving means (not shown) for moving this sorting member 51. The sorting member 51 is downstream of the transport member 42, and is disposed in a state such that the spring-shaped member M can pass through the hole portion 51a (FIG. 8A). If the judgment means 36 judges that the spring-shaped member M is a good part, the sorting member 51 is kept at its current position; the spring-shaped member M passes through the hole portion 51a and is collected by the good part collection device 110 or transported to the next step. When a spring-shaped member M is judged to be a bad part, the sorting member 51 moves by a movement means to a position where the spring-shaped member M cannot pass through the hole portion 51a, as shown in FIG. 8B. This causes the spring-shaped member M to collide with the sorting member 51 and be sent to the bad part collection device 120.

As shown in FIGS. 9A and 9B, a configuration can be adopted in which the transport member 42 is branched in two, and a sorting member 52 is placed at the branching point. FIGS. 9A and 9B are plan views in which the measuring member 40 is seen from above. FIG. 9A shows the state of the sorting member 52 when the spring-shaped member M is judged to be good product; FIG. 9B shows the state of the sorting means 52 when the spring-shaped member M is judged to be a defective part. Thus in response to the pass/fail judgment results, the direction in which the spring-shaped member M is discharged by the sorting means 52 is switched, and the spring-shaped member M can be sorted into good and bad parts.

A constitution can be adopted in which multiple inspection detectors 23 are prepared and multiple spring-shaped members M are guided in parallel from the transport device 100 or by a branched guide means and inspection performed. A single evaluation apparatus 30 can be used for multiple inspection detectors 23.

In the present embodiment we showed a constitution for the measuring member 40 in which the spring-shaped member M moves by gravity, but the invention is not limited thereto, and a constitution may be adopted in which the guide member 41 and the transport member 42 comprise a transport mechanism such as a conveyor belt.

In the present embodiment we showed a constitution in which extraction of output values starts when the sensing device 43 senses a spring-shaped member M, but a constitution may also be adopted in which output values are constantly monitored, and extraction of output values is started when a rise in output value is detected.

In the present embodiment we used an integral value of the output value ($\Sigma s$) as the threshold value and the representative value for comparison with the threshold value ($\Sigma thi$), but the peak value (maximum value) of the output value may also be used. When integral values of the output value are used for the threshold value and the representative value for comparison to the threshold value, variability in the values caused by the state of passage etc. of the spring-shaped member M inside the inspection detector 23 can be reduced, so a more accurate measurement and better pass/fail judgment can be made.

The control device 60 does not have to be provided separately from the judgment means 36, and may be constituted as an integral single unit.

Effect of the Embodiment

Using the surface property inspection and sorting apparatus 1 and the surface property inspection method of the present invention, an eddy current can be excited in a spring-shaped member M using an inspection detector 23 coil 23B, and surface properties of the spring-shaped member M can be evaluated based on output signals output from the AC bridge circuit 20. This enables high precision inspection of the surface state using a simple circuit configuration.

Using the surface property inspection and sorting apparatus 1, because the spring-shaped member M is passed through the inspection detector 23 without stopping, and the spring-shaped member M surface properties are evaluated and a pass/fail judgment made by the surface property inspection device 2, the time for evaluating the spring-shaped member M surface properties and making a pass/fail judgment can be shortened. This makes it possible to evaluate spring-shaped member M surface properties and make pass/fail judgments in a manner suited to short cycle time. It also enables a reliable selection between good and bad spring-shaped member M parts using a sorting means 50.

A transport device 100 is provided in this surface property inspection and sorting system SYS, enabling the construction of a surface property inspection and sorting system capable of continuously transporting, evaluating, sorting, and discharging spring-shaped members M. Also, good parts can be collected and transported to the next process step by the good part collection device 110, and bad parts only can be sorted and collected by the bad part collection device 120, so the sorting operation can be efficiently conducted.

What is claimed is:

1. A surface property inspection and sorting apparatus for evaluating a surface property of a coil spring-shaped member subjected to surface treatment by a surface treatment apparatus and sorting the coil spring-shaped members between good parts and bad parts, comprising:
   a surface property inspection device;
   a guide member; and
   a sorting device;
   the surface property inspection device comprising:
      an AC bridge circuit,
      an AC power supply for supplying AC power to the AC bridge circuit, and
      an evaluation apparatus for evaluating surface property of the coil spring-shaped member based on an output signal having continuous sinusoidal waveform from the AC bridge circuit;
   wherein the AC bridge circuit comprises:
      a variable resistor capable of varying the distribution ratio between a first resistor and a second resistor;
      an inspection detector comprising a core and a coil wound around the core and capable of exciting an AC magnetic field, formed so that said coil can be disposed to excite an eddy current in the coil spring-shaped member, wherein the core has an interior passage formed through the core so that the coil spring-shaped member goes through the interior passage; and
      a reference detector for detecting a reference state serving as a reference for comparing outputs from the inspection detector; and
   wherein the evaluation apparatus evaluates the surface property of the coil spring-shaped member based on an output signal from the AC bridge circuit while AC power is supplied to the AC bridge circuit, the inspection detector detects electromagnetic property of the coil spring-shaped members, and the reference detector detects the reference state;
   wherein the guide member comprises a guiding surface curved substantially similarly with the interior passage of the core of the inspection detector so that the guiding surface guides the coil spring-shaped members along the guiding surface to slide into the interior passage of the coil of the inspection detector without interruption, the guiding surface being arranged for the coil spring-shaped members slide thereon by means of gravity into the interior passage of the core;
   wherein the sorting device sorts the coil spring-shaped members between good parts and bad parts after surface property has been evaluated by the inspection detector; and
   wherein the surface property inspection device performs an evaluation and judges whether the surface property of the coil spring-shaped member is good or bad based on an integrated value which is calculated by integrating the output signal from the AC bridge circuit obtained during an entire period during which the single coil spring-shaped member is passing through inside the coil of the inspection detector.

2. The apparatus of claim 1, further comprising a sensing device for sensing the fact that the coil spring-shaped member has been guided to the inspection detector, whereby the surface property inspection device extracts the output signal from the AC bridge circuit based on a sensing signal from the sensing device.

3. A surface property inspection and sorting system comprising:
the surface property inspection and sorting apparatus of claim 1; and
a transport device for transporting the coil spring-shaped member subjected to surface treatment by the surface treatment apparatus to the surface property inspection device.

4. The system of claim 3, further comprising a good part collection device for transporting the coil spring-shaped members judged and sorted as good parts, and a bad parts collection device for collecting the coil spring-shaped members judged and sorted as bad parts.

5. The system of claim 3, wherein the transport device comprises a conveyor belt and partitioning members for partitioning the position on the conveyor belt where the coil spring-shaped members are loaded.

6. A surface property inspection and sorting method, comprising steps of:
providing the surface property inspection and sorting apparatus of claim 1;
guiding the coil spring-shaped members by a guide member so that the coil spring-shaped members, which have been surface treated by the surface treatment apparatus, pass through the surface property inspection device without stopping;
judging whether the surface property of the coil spring-shaped member is good or bad by using the surface property inspection device by comparing the integrated value with pre-set threshold values, the integrated value being obtained from the output signal while the single coil spring-shaped members are passing through the inspection detector; and
sorting the coil spring-shaped members between good parts and bad parts based on a judgment made by the surface property inspection device.

7. The method of claim 6, wherein the judging step is carried out in a state that a reference sample is disposed on the reference detector, and the reference sample has same structure as the coil spring-shaped member for which the surface property is being evaluated.

8. The method of claim 6, wherein the evaluation apparatus further comprises a memory device for correlating identifying information for each coil spring-shaped member and inspection data for the surface property of said coil spring-shaped members.

* * * * *